US010712976B2

(12) United States Patent
Sela et al.

(10) Patent No.: US 10,712,976 B2
(45) Date of Patent: Jul. 14, 2020

(54) STORAGE PROTECTION UNIT

(71) Applicant: Western Digital Technologies, Inc., San Jose, CA (US)

(72) Inventors: Rotem Sela, Hod Hasharon (IL); Miki Sapir, New Ziona (IL); Eliad Adi Klein, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/722,616

(22) Filed: Oct. 2, 2017

(65) Prior Publication Data

US 2019/0102114 A1 Apr. 4, 2019

(51) Int. Cl.
| | | |
|---|---|---|
| *G06F 21/00* | (2013.01) | |
| *G06F 3/06* | (2006.01) | |
| *G06F 21/34* | (2013.01) | |
| *G06F 21/80* | (2013.01) | |
| *G06F 21/79* | (2013.01) | |
| *G06F 21/85* | (2013.01) | |
| *G06F 21/44* | (2013.01) | |
| *G06F 13/38* | (2006.01) | |

(52) U.S. Cl.
CPC ............ *G06F 3/0679* (2013.01); *G06F 21/34* (2013.01); *G06F 21/44* (2013.01); *G06F 21/79* (2013.01); *G06F 21/805* (2013.01); *G06F 21/85* (2013.01); *G06F 13/385* (2013.01); *G06F 2212/1052* (2013.01)

(58) Field of Classification Search
CPC ........ G06F 21/34; G06F 21/85; G06F 21/805; G06F 21/79; G06F 3/0679; G06F 13/385; G06F 2212/1052
See application file for complete search history.

(56) References Cited

U.S. PATENT DOCUMENTS

| | | |
|---|---|---|
| 6,324,537 B1 | 11/2001 | Moran |
| 7,165,152 B2 | 1/2007 | Blumenau et al. |
| 7,921,270 B2 | 4/2011 | Mosek et al. |
| 8,086,585 B1 | 12/2011 | Brashers et al. |
| 8,321,522 B2 | 11/2012 | Cherian et al. |

(Continued)

OTHER PUBLICATIONS

JEDEC Standard, "Universal Flash Storage (UFS)," Version 2.1, JESD220C, Sep. 2013, 382 pages.

*Primary Examiner* — Joseph P Hirl
*Assistant Examiner* — Chi D Nguy
(74) *Attorney, Agent, or Firm* — Vierra Magen Marcus LLP

(57) ABSTRACT

Technology is disclosed that provides security for data stored in a non-volatile memory device. The non-volatile memory device may be embedded in a host system. The host system may further have a host controller that is configured to obtain a memory access message from an initiator to access the non-volatile memory. The host controller may be further configured to provide the memory access message to the memory controller. The memory access message may contain an identifier of the initiator, which may be verified by the host controller. The memory controller may be configured to access the identifier of the initiator from the memory access message, and grant or deny non-volatile memory access to the initiator based on whether the initiator has access rights to a region of the non-volatile memory to which the initiator seeks access.

18 Claims, 11 Drawing Sheets

(56) References Cited

U.S. PATENT DOCUMENTS

| | | | |
|---|---|---|---|
| 9,401,869 B1* | 7/2016 | Tang | H04L 47/70 |
| 2007/0083939 A1 | 4/2007 | Fruhauf et al. | |
| 2010/0125857 A1* | 5/2010 | Dommeti | G06F 3/0604 |
| | | | 719/326 |
| 2016/0070470 A1* | 3/2016 | Uchida | G06F 3/061 |
| | | | 711/103 |
| 2017/0160988 A1* | 6/2017 | Nemoto | G06F 3/0619 |
| 2017/0286293 A1* | 10/2017 | Gayman | G06F 12/0646 |
| 2018/0024944 A1* | 1/2018 | Zeng | G06F 12/1009 |
| 2018/0081556 A1* | 3/2018 | Lee | G06F 3/0607 |
| 2018/0357184 A1* | 12/2018 | Arora | G06F 12/1483 |

* cited by examiner

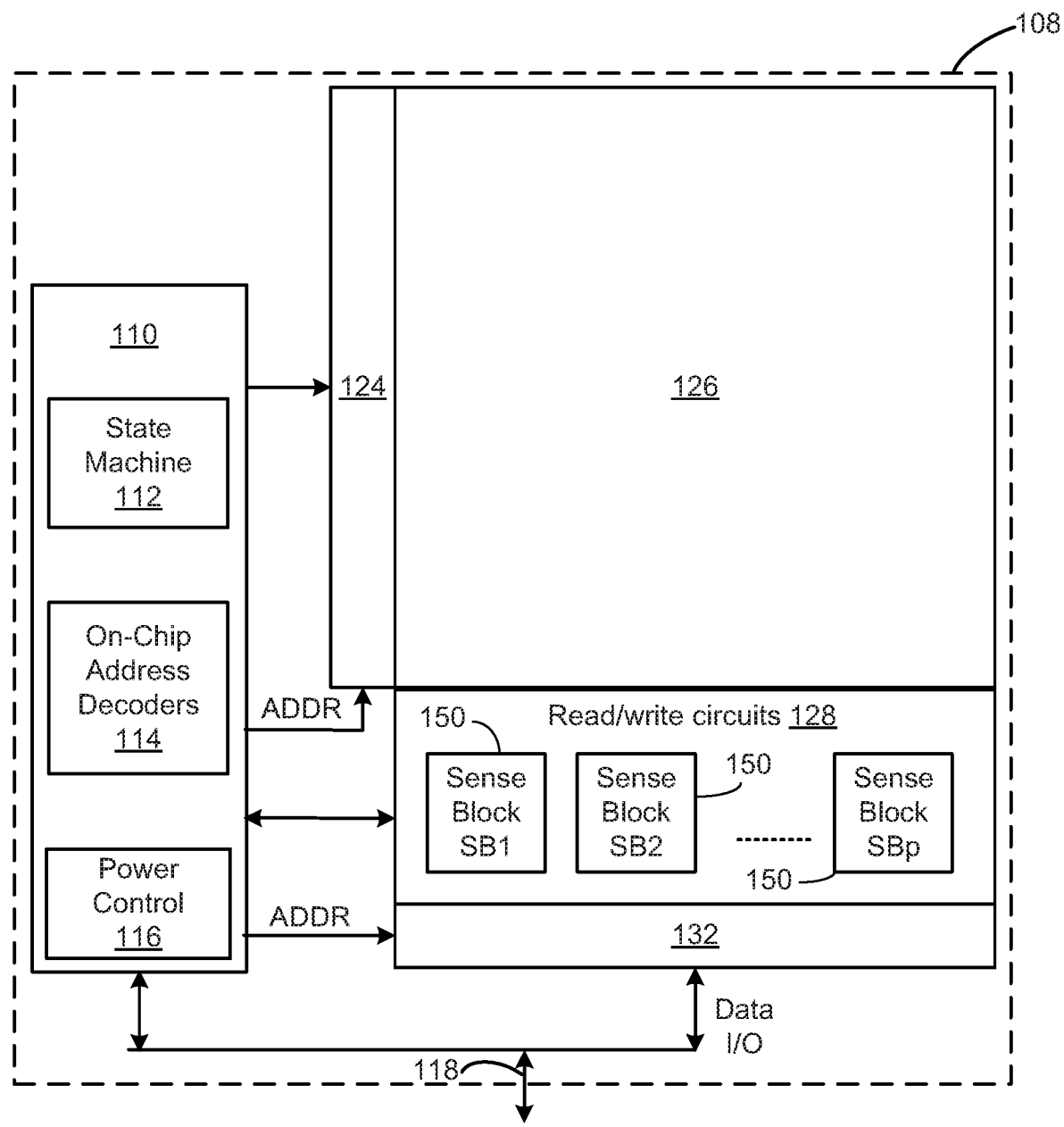

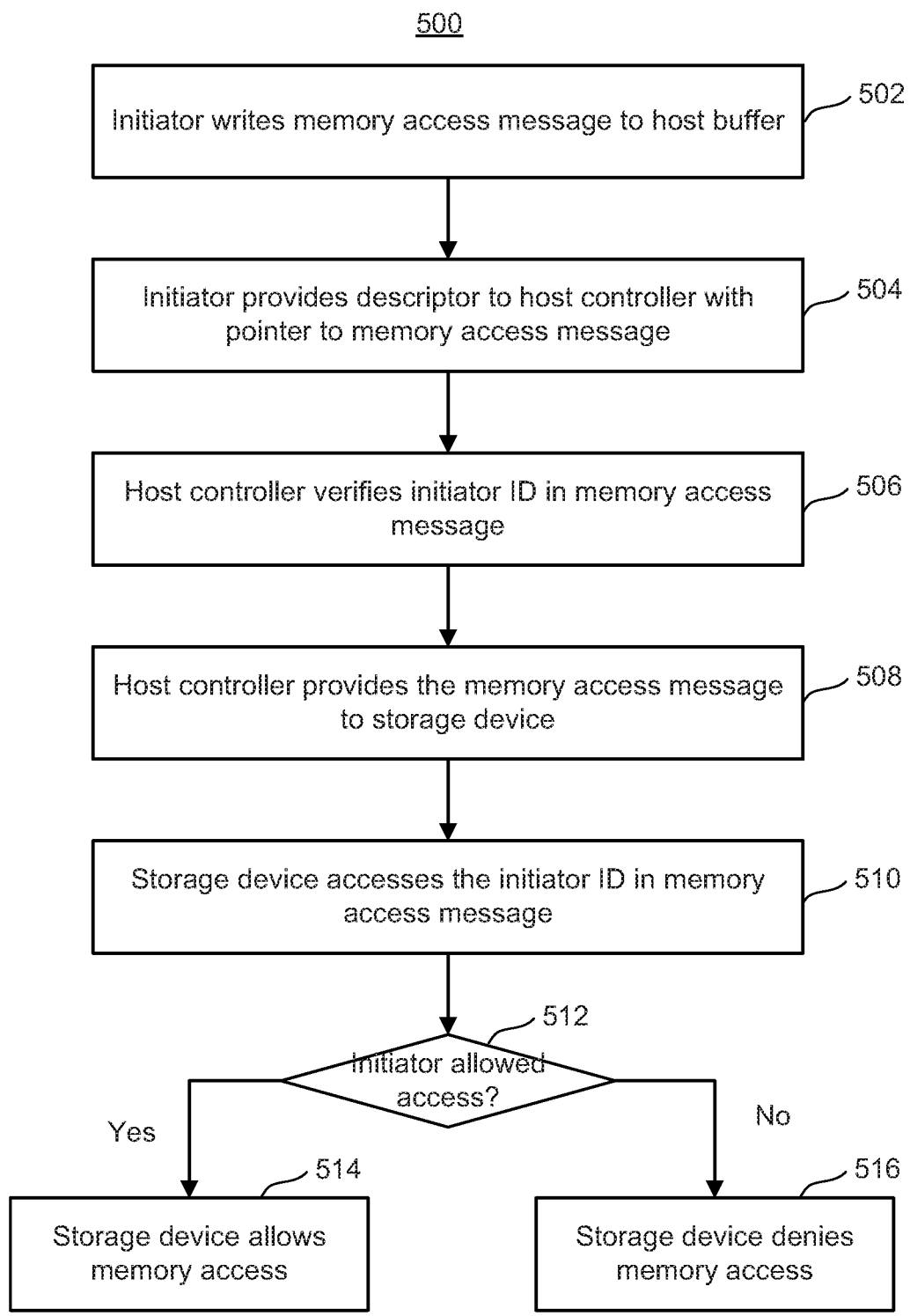

STORAGE PROTECTION UNIT

BACKGROUND

The present disclosure relates to technology for non-volatile storage.

Semiconductor memory is widely used in various electronic devices such as mobile computing devices, mobile phones, solid-state drives, digital cameras, personal digital assistants, medical electronics, servers, and non-mobile computing devices. Semiconductor memory may include non-volatile memory or volatile memory. A non-volatile memory device allows information to be stored or retained even when the non-volatile memory device is not connected to a power source.

A non-volatile memory device may be used to provide data for a host system. Examples of host systems include, but are not limited to, smartphones, personal digital assistants (PDA), laptop computers, notebook computers, set top boxes, cameras, or other electronic device. In some cases, the non-volatile memory device may be embedded within the host system. However, in other cases, the non-volatile memory device is not embedded within the host system. For example, a USB flash drive is typically not embedded in a host system.

Sometimes multiple entities may share access to non-volatile memory in the non-volatile memory device. For example, a host system may have several sub-systems that each access the non-volatile memory. These sub-systems might not trust each other. For example, one sub-system should not access the data of another sub-system.

BRIEF DESCRIPTION OF THE DRAWINGS

Like-numbered elements refer to common components in the different figures.

FIG. 3B is a block diagram of a non-volatile memory die.

FIG. 5 is a flowchart of one embodiment of a process of controlling access to data in non-volatile storage.

DETAILED DESCRIPTION

Technology is disclosed herein that provides security for data stored in a non-volatile memory device. The non-volatile memory device may also be referred to as a non-volatile storage device. The non-volatile memory device may comprise non-volatile memory (also referred to as non-volatile storage) and a memory controller. Access to the non-volatile memory may be shared by a number of entities. The memory controller may perform access control based on an identifier of the entity seeking to access the non-volatile memory.

The non-volatile memory device may be embedded in a host system. The host system may further have a host controller that is configured to obtain a memory access message from an initiator to access the non-volatile memory. The host controller may be further configured to provide the memory access message to the memory controller. The memory access message may contain an identifier of the initiator, which may be verified by the host controller. The memory controller may be configured to access the identifier of the initiator from the memory access message, and grant or deny non-volatile memory access to the initiator based on whether the initiator has access rights to a region of the non-volatile memory to which the initiator seeks access.

Figure 1A:
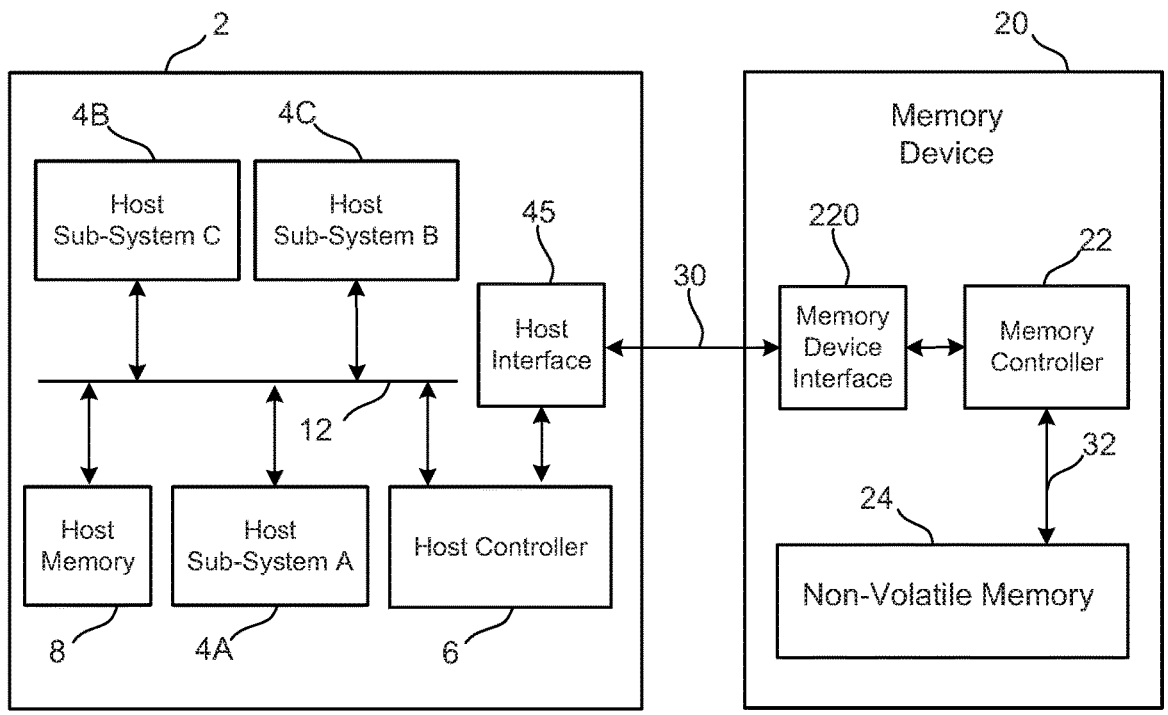
FIG. 1A is a block diagram of a memory device and a host having sub-systems.

FIG. 1A is an example system in which embodiments may be practiced. A memory device 20 is connected to a host 2 through a host connection 30. The memory device 20 may be embedded within an apparatus containing the host 2. For example, the memory device 20 might be embedded in a smartphone, personal digital assistant (PDA), laptop computer, notebook computer, set top box, camera, etc. In one embodiment, the host environment is an automobile. The host 2 may perform the functions of the smartphone, PDA, laptop computer, notebook computer, set top box, camera, automobile's electronic system, etc. Note that the host could thus be considered to be the apparatus such as the smartphone, personal digital assistant (PDA), laptop computer, notebook computer, set top box, camera. Thus, when the memory device 20 is embedded within such an apparatus, this may be referred to as embedding the memory device 20 within the host. However, the memory device 20 is not required to be embedded within the host. For example, the memory device 20 may be connectable to a host via an external port (e.g., USB, SCSI, etc.) of the host. The memory device 20 may be, for example, a Universal Flash Storage (UFS) device, embedded multi-media card (eMMC) memory device, MMC memory device, solid state drive (SSD), Memory Stick, Secure Digital (SD) memory card, CompactFlash (CF) storage device, USB flash drive, etc.

Memory device 20 includes memory controller 22 in communication with non-volatile memory 24. In one embodiment, non-volatile memory 24 can be implemented using one or multiple memory die. Interface 32 between memory controller 22 and non-volatile memory 24 may be any suitable interface. In one embodiment, the non-volatile memory 24 is a NAND memory and interface 32 is compliant with a version of the Open NAND Flash Interface (ONFI). However, non-volatile memory 24 is not limited to NAND. Non-volatile memory 24 is NOR in one embodiment. Non-volatile memory 24 is resistive random-access memory (ReRAM), in one embodiment. Non-volatile memory 24 is magnetic storage (such as a hard disk drive), in one embodiment. Non-volatile memory 24 could be another type of memory. In one embodiment, non-volatile memory 24 includes a two-dimensional array of non-volatile memory cells. In one embodiment, non-volatile memory 24 includes a three-dimensional array of non-volatile memory cells.

The memory device 20 has a memory device interface 220. The memory device interface 220 contains logic thereon to control the transfer of signals over the host connection 30. Such logic in the memory device interface 220 may also generate the signals to be transmitted over the host connection 30 and receive and decode the signals received over the host connection 30. In one embodiment, device interface 220 includes a UFS InterConnect Layer (UIC) and a UFS Transport Protocol Layer (UTP).

The host connection 30 represents a path that permits signals to transfer information (e.g., data, commands, etc.) between the memory device interface 220 and the host interface 45. The connection 30 could include a physical connection (e.g., electrically conductive wires or traces, optical waveguides, etc.) or be wireless. The signals could be transmitted via electrical voltage, electrical current, optical signal, electromagnetic radiation, etc. The physical nature of the host connection 30 (e.g., number of conductive lines, definition of each conductive line, timing of signals over the conductive lines, etc.) may comply with a wide variety of technologies and/or protocols. Host connection 30 may comply with, for example, multi-media card (MMC), eMMC, Universal Flash Storage (UFS), Small Computer Systems Interface (SCSI), non-volatile memory express (NVMe), Peripheral Component Interconnect Express (PCIe), Universal Serial Bus (USB) interface, Bluetooth interface, etc. In some cases, the host connection 30 of memory device 20 may be temporarily inserted into the host 2 by, for example, a port (such as a USB port). In some cases, the host 2 may have a card reader into which the host connection 30 may be inserted/removed.

The host interface 45 contains logic thereon to control the transfer of signals over the host connection 30. The logic in the host interface 45 may also generate the signals to be transmitted over the host connection 30 and receive and decode the signals received over the host connection 30. In one embodiment, host interface 45 includes a UFS InterConnect Layer (UIC) and a UFS Transport Protocol Layer (UTP).

Host 2 also includes sub-systems 4A, 4B, and 4C, which are connected to bus 12. Host 2 also includes host memory 8 connected to bus 12. Host memory 8 could include any combination of volatile (e.g., RAM) or non-volatile memory (e.g., ROM). The various sub-systems 4A-4C may share access to the non-volatile memory 24 in the memory device 20. The memory controller 22 controls access to the non-volatile memory 24, in accordance with embodiments disclosed herein. Thus, memory controller 22 may enforce access control restrictions that prevent a sub-system 4 from accessing a region in the non-volatile memory 24 that is allocated to another sub-system 4.

In one embodiment, the different sub-systems are different electronic control units (ECU) in an automobile. For example, the different sub-systems may include one or more of an engine management ECU, transmission ECU, anti-lock braking ECU, traction control ECU, airbag ECU, and/or power steering ECU. In such a vehicular environment, the bus 12 may be a Controller Area Network (CAN) bus. A CAN bus is a vehicle bus standard that allows ECUs and other electronic devices to communicate with each other. Note that a host computer is not required for the ECUs to communicate. Also note that a Controller Area Network can be used in environments other than automobiles. Further note that an automotive environment is not limited to a Controller Area Network. In one embodiment, the automotive environment uses a Local Interconnect Network (LIN), which is a serial network protocol that allows communication between electronic components in vehicles (e.g., automobiles).

In one embodiment, the different sub-systems are different processors. In one embodiment, one host sub-system performs primary application processing, and may be referred to as an "application processor." The application processor may perform functions needed to support a device's applications, including memory management, graphics processing and multimedia decoding. In one embodiment, the application processor is a system on a chip (SoC) designed to support applications running in a mobile operating system environment. The sub-systems could also include specialized processors such as a baseband (modem) processor, Wi-Fi processor, etc. Note that some or all of the functionality of these different sub-systems could be integrated onto the same semiconductor package, or some or all of the sub-systems can be provided as discrete semiconductor packages. The term "semiconductor package" is being used herein as is commonly used in the semiconductor industry to describe a casing that houses a semiconductor device and has some sort of external interface such as pins, ball grid array, etc.

One or more of the sub-systems 4 may perform the intended functions of host 2. For example, host 2 can be a smartphone, personal digital assistant (PDA), laptop computer, notebook computer, set top box, camera, automobile's electronic system, or other electronic device. One or more of the sub-systems 4 performs the functions of a smartphone, PDA, laptop computer, notebook computer, set top box, camera, etc. Host memory 8 and/or non-volatile memory 24 may store software applications to run on one or more of the sub-systems 4.

Host sub-systems 4A-4C are connected to host controller 6 via bus 12 for communicating with memory device 20. In some embodiments, only one of the host sub-systems 4 communicates directly with the host controller 6. The other sub-systems 4 may access the memory device 20 by communicating through the one (or more) host sub-systems 4 that communicate directly with the host controller 6.

In one embodiment, host controller 6 exposes registers to a host sub-system 4 to allow the host sub-system 4 to place descriptors of commands and data into the registers. A host sub-system 4 places the actual commands and the actual data into host memory 8, in one embodiment. The host controller 6 transfers data to be written to memory device 20 using a DMA from the host memory 8, in one embodiment. The memory controller 22 transfers data read from the non-volatile memory 24 to the host memory 8 using a DMA, in one embodiment. The host controller 6 is implemented in hardware, in some embodiments. For example, the host controller 6 may be an application specific integrated circuit (ASIC), a Field Programmable Gate Array (FPGA), an electrical circuit, a digital logic circuit, an analog circuit, a combination of discrete circuits, gates, or any other type of hardware or combination thereof. Note that although the host interface 45 is depicted as separate from the host controller 6, the host interface 45 could be integrated with the host controller 6.

In one embodiment, host memory 8 stores code to start a boot process for host 2. When host 2 is turned on or restarted (or is otherwise restarting the boot process), host controller 6 accesses code in host memory 8 to start the boot process. That code will instruct host controller 6 to read the boot data from memory device 20. In one embodiment, the code will inform the host controller 6 at which logical address and/or logical unit number (LUN) the boot data is stored. The LUN is an identifier of a Logical Unit (LU). A Logical Unit, as defined herein, as an externally addressable, independent, processing entity. The boot data, which can include code as well as reference information (e.g., fields, integers, floating point numbers, characters, words, pointers, etc.), will be used by the host to perform a boot process. The memory device 20 controls access to the boot code, based on an identifier in a request for the boot code, in one embodiment.

In one embodiment, the host has a host logical address space. When the host 2 sends requests over the host connection 30 to write or read data to/from the non-volatile memory 24, the host may specify a logical address. The memory controller 22 may translate the logical address to a physical address within the non-volatile memory 24, and send a command to the non-volatile memory 24 to write or read data to/from that physical address. In one embodiment, the memory controller 22 controls access to the non-volatile memory 24 based on whether the initiator of the request to access memory has access rights to the logical address.

The memory controller 22 may also determine (or select) what physical region of the non-volatile memory 24 is assigned to what logical addresses. This allows the memory controller 22 to control what physical region of the non-volatile memory 24 is assigned to each initiator.

Figure 1B:
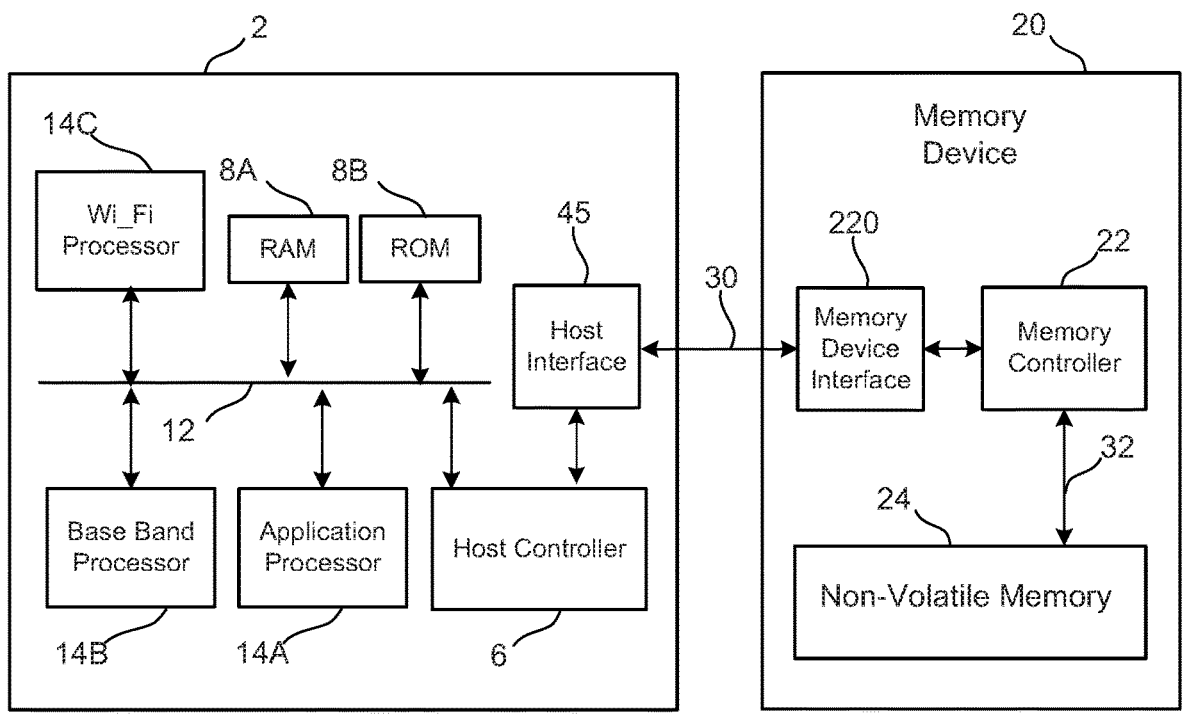
FIG. 1B is a block diagram of a memory device connected to a host having processors.

FIG. 1B is a block diagram of one embodiment of a host system. In this embodiment, the host 2 includes an Application Processor 14A, a Baseband Processor 14B, and a Wi-Fi Processor 14C. These processors 14A-14C are one embodiment of the host sub-systems 4A-4C of the host 2 in FIG. 1A. Thus, Application Processor 14A, Baseband Processor 14B, and Wi-Fi Processor 14C may share access to the non-volatile memory 24. The various processors could each be physically separate semiconductor packages. Alternatively, one or more of the processors could be integrated into the same semiconductor package.

Memory controller 22 performs access control to the non-volatile memory 24, in accordance with embodiments described herein. ROM 8B and/or non-volatile memory 24 may store software applications to run on the processors 14A-14C. RAM 8A may be used to temporality store data and/or code while executing software applications. RAM 8A could be DRAM, SRAM, etc.

Figure 1C:
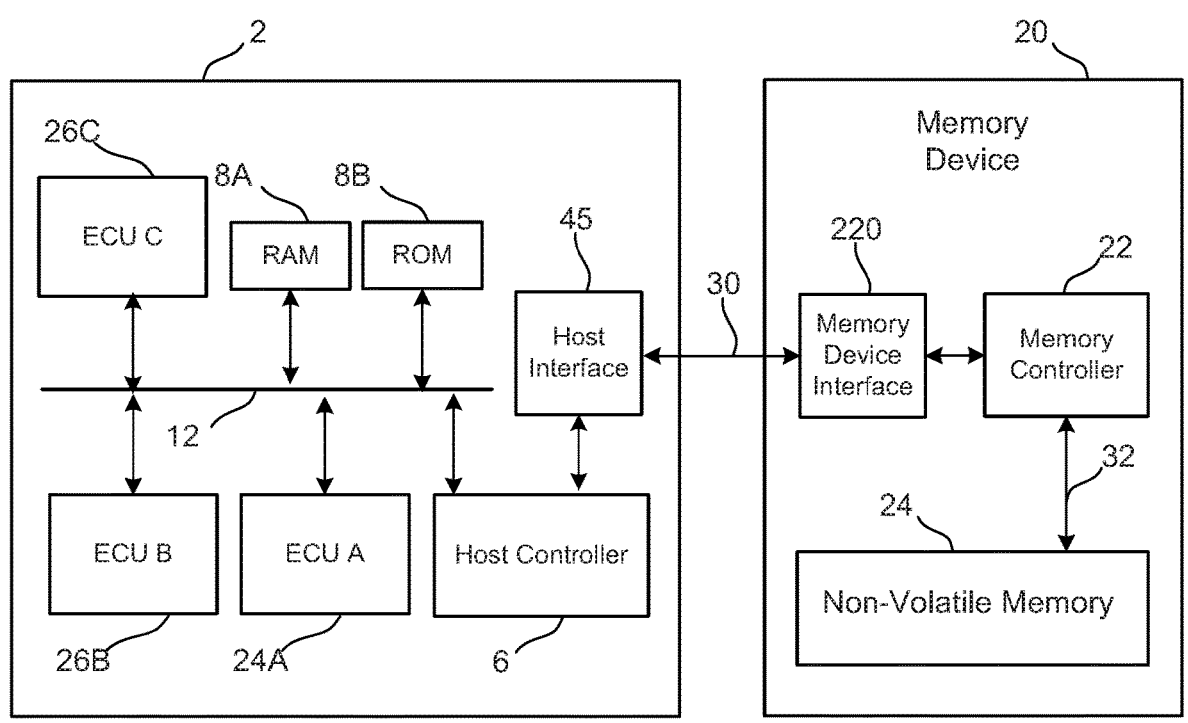
FIG. 1C is a block diagram of one embodiment of a host system having ECUs.

FIG. 1C is a block diagram of one embodiment of a host environment. In this embodiment, the host environment could be an automobile in which the memory device 20 resides. For the sake of discussion, the host 2 in FIG. 1C refers to the electronic components other than the memory device 20. The host 2 includes ECU 26A, ECU 26B, and ECU 26C. Recall that an ECU is an electronic control unit. These ECUs 26A-26C are one embodiment of the host sub-systems 4A-4C of the host 2 in FIG. 1A. Thus, ECU 26A, ECU 26B, and ECU 26C may share access to the non-volatile memory 24. The various ECUs could each be physically separate semiconductor packages. Alternatively, one or more of the ECUs could be integrated into the same semiconductor package.

In some embodiments, the memory device 20 of FIGS. 1A and/or 1B is embedded in a casing. The casing protects the memory device 20 (and possibly other components). The casing could be made from a variety of materials including, but not limited to, ceramic, plastic, metal, or glass. In one embodiment, the casing contains the memory device 20 but does not contain any components of the host 2. In one embodiment, the casing contains the memory device 20 and also contains one or more of the host components.

In some embodiments, the aforementioned casing that houses the memory device 20 is a semiconductor package. A semiconductor package is a casing containing semiconductor electronic components. A semiconductor package may have contact pins or leads that are used to connect external circuits to the internal semiconductor electronic components. For example, the memory device interface 220 may comprise contact pins or leads that are used to connect the host 2 to the memory controller 22. However, semiconductor package could house both the memory device 20 and host 2, in which case the memory device interface 220 would not be exposed by the semiconductor package.

In one embodiment, the memory device 20 includes a mechanical system, such as a hard disk drive. In one such embodiment, the memory device 20 is embedded in a casing that is not necessarily a semiconductor package. Although it will be understood that even a memory device 20 having a mechanical system, such as a hard disk drive, may contain semiconductor electronic components. For example, the memory controller 22 in a hard disk drive may comprise semiconductor electronic components.

In one embodiment, the casing contains the memory device 20, the host interface 45, and the host controller 6. In one embodiment, the casing contains the memory device 20, the host interface 45, the host controller 6, host memory 8, and the host sub-system(s) 4 (there may be any number of host sub-systems. In one embodiment, the casing contains the memory device 20, the host interface 45, the host controller 6, RAM 8A, ROM 8B, and one or more of the processors 14A-14C. For example, one semiconductor package might contain the memory device 20, the host interface 45, the host controller 6, RAM 8A, ROM 8B, and the Application Processor 14A. The Base Band Processor 14B and the Wi-Fi Processor 14C might be provided in two separate semiconductor packages. Note that the Base Band Processor 14B and the Wi-Fi Processor 14C may have their own RAM 8A and ROM 8B.

A casing, such as but not limited to a semiconductor package, may protect the memory device 20 from tampering. Since the memory controller 22 and the non-volatile memory 24 are embedded in a casing, in some embodiments, tampering to gain access to the non-volatile memory 24 is reduced or eliminated.

Figure 2A:
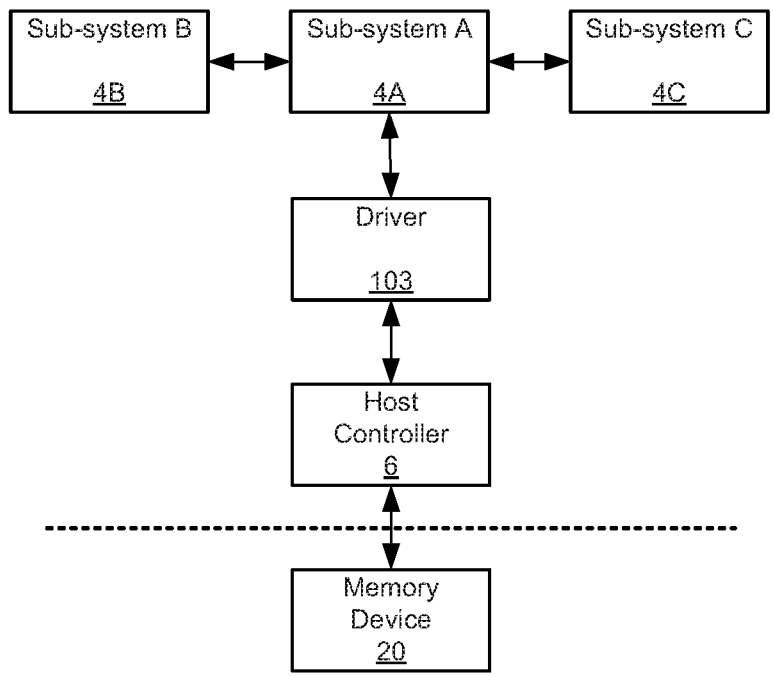
FIGS. 2A and 2B are block diagrams that illustrate sub-systems sharing access to a memory device.

FIG. 2A is a block diagram that illustrates sub-systems sharing access to a memory device 20. The example in FIG. 2A is consistent with the embodiments of FIGS. 1A, 1B, and 1C. Three sub-systems (Sub-system A 4A, Sub-system B 4B, and Sub-system C 4C) are sharing access to the memory device 20. Sub-system A 4A has a driver 103 that it uses to access host controller 6. Sub-system B 4B and Sub-system C 4C access the memory device through Sub-system A 4A. As one example, Sub-system B 4B might be a Wi-Fi processor 14C, Sub-system A 4A might be an application processor 14A, and Sub-system C 4C might be a base band (modem) processor 14B. As one example, the sub-systems might be ECUs. The driver 103 might execute on the application processor 14A. However, the Sub-systems are not required to be implemented by different processors. In one embodiment, each of the Sub-systems has a unique identifier. Each of the Sub-systems may initiate a request to access non-volatile memory in the memory device 20. Herein, one example of such a request is referred to as a memory access message.

The host controller 6 interfaces with the memory device 20, which controls access to its non-volatile memory. The host controller 6 may obtain a command to access non-volatile memory in the memory device 20. This command is one example of a memory access message. In one embodiment, the driver 103 sends a descriptor of where to find the command in host memory 8 to a register in the host controller 6. This command may have an identifier of the initiator of the memory access message. In this example, the identifier could be any of the sub-systems 4A, 4B, or 4C. However, the command is not required to contain the identifier of the initiator. In one embodiment, the host controller 6 inserts an identifier of the initiator into the command. The host controller 6 transfers the command to the memory device 20. The host controller 6 may also transfer data to the memory device, if the memory access is a write.

The memory device 20 controls access to its non-volatile memory based on an identifier of the initiator of the memory access in a memory access message from the host controller 6. Thus, the memory device 20 may determine whether the sub-system 4 that requested memory access should be granted access. The memory device 20 may make this determination, in part, based on a logical unit number, a logical address, or another identifier.

Figure 2B:
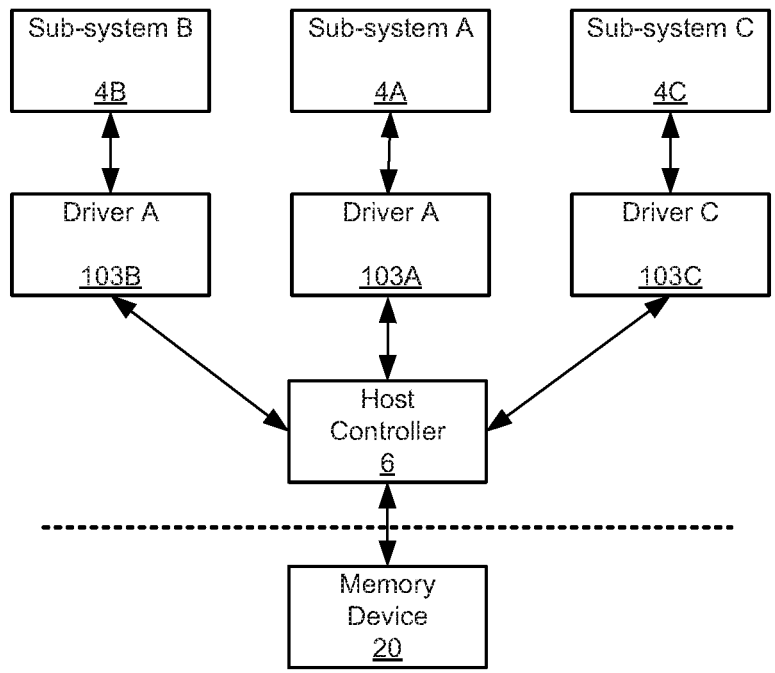

FIG. 2B is a block diagram that illustrates sub-systems sharing access to a memory device. This example differs from FIG. 2A in that each Sub-system 4 has its own driver 103. Thus, Sub-system A 4 uses driver 103A to communicate with host controller 6 to access non-volatile memory in the memory device 20; Sub-system B 4B uses driver 103B to communicate with host controller 6 to access non-volatile memory in the memory device 20; and Sub-system C 4C uses driver 103C to communicate with host controller 6 to access non-volatile memory in the memory device 20. With reference to FIG. 1B, driver 103A might execute on application processor 14A; driver 103B might execute on base band processor 14B; and, driver 103C might execute on Wi-Fi processor 14C.

Figure 3A:
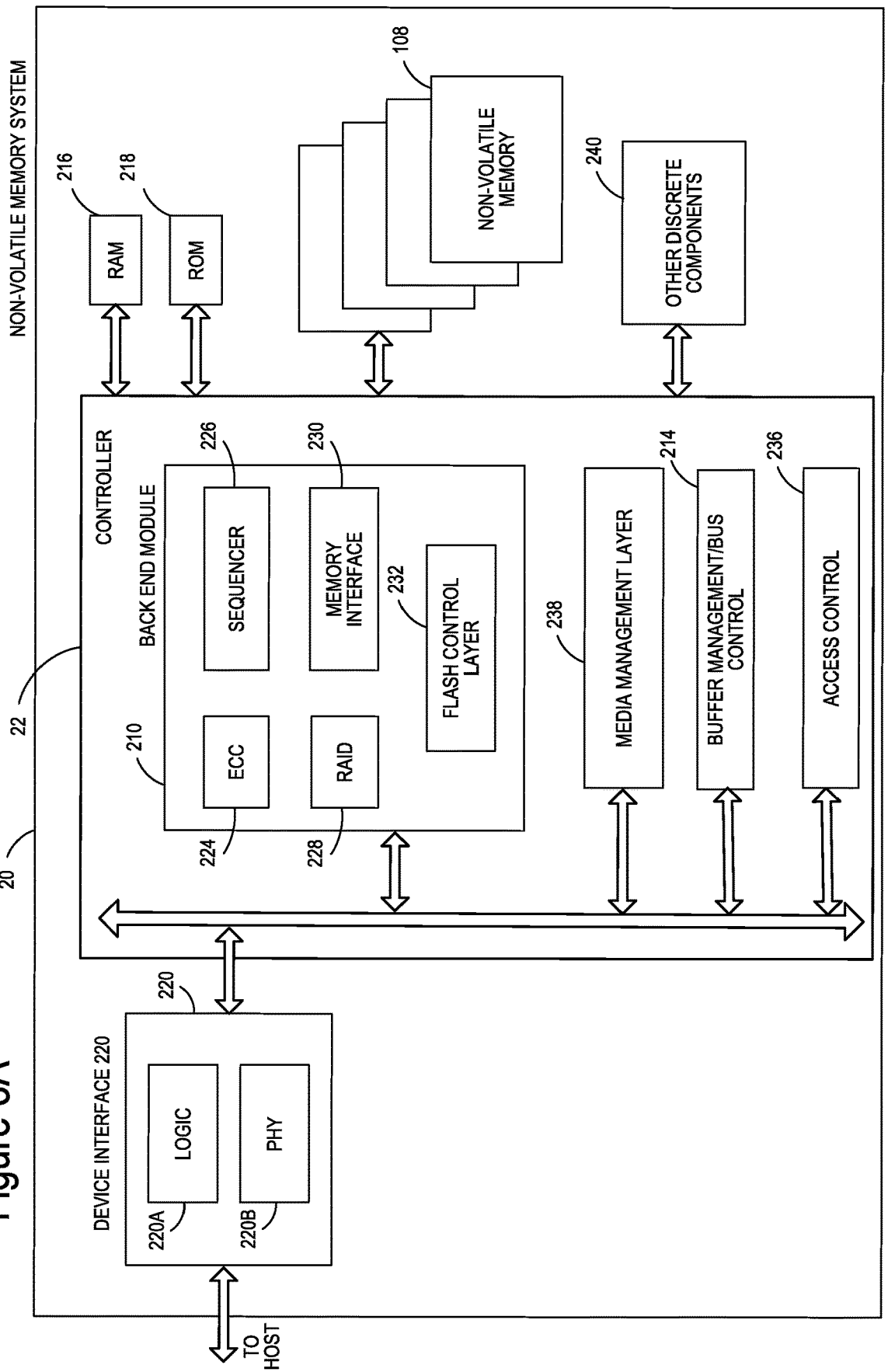
FIG. 3A is a block diagram of one example of a memory device.

FIG. 3A is a block diagram of one example of a memory device 20. However, the architecture depicted in FIG. 3A can also be used to implement other types of non-volatile memory devices. Memory device 20 includes a controller 22 connected to one or more non-volatile memory die 108 (which comprise the non-volatile memory 24 depicted in FIG. 1A or 1B). The memory device 20 also includes device interface 220, which provides a connection between host and memory controller 22.

As used herein, for a system that uses non-volatile memory, a controller is a device that manages data stored on the non-volatile memory and communicates with a host. Controller 22 can have various functionality in addition to the specific functionality described herein. For example, controller 22 can format the non-volatile memory to ensure the memory is operating properly, map out bad memory cells (the physical unit of storage), and allocate spare memory cells to be substituted for future failed cells. Some part of the spare memory cells can be used to hold firmware to operate the controller and implement other features. In operation, when a host needs to read data from or write data to the non-volatile memory, it will communicate with controller 22. If the host provides a logical address to which data is to be read/written, controller 22 converts the logical address received from the host to a physical address in the physical flash memory. Alternatively, the host can provide the physical address. Controller 22 can also perform various memory management functions, such as, but not limited to, wear leveling (distributing write operations among memory die or blocks of the memory die to avoid wearing out specific blocks of memory that would otherwise be repeatedly written to) and garbage collection (after a block is full, moving only the valid pages of data to a new block, so the full block can be erased and reused).

In some embodiments, memory device 20 includes a single channel between controller 22 and non-volatile memory die 108; however, the subject matter described herein is not limited to having a single memory channel. For example, in some memory system architectures 2, 4, 8 or more channels may exist between controller 22 and memory die 108, depending on controller capabilities. In any of the embodiments described herein, more than a single channel may exist between controller 22 and memory die 108, even if a single channel is shown in the drawings.

As depicted in FIG. 3A, controller 22 includes a back end module 210 that interfaces with the one or more non-volatile memory die 108, and various other modules that perform functions which will now be described. The controller 22 is depicted as being connected to device interface 220 that interfaces with a host. Alternatively, the device interface 220 may be within the controller 22.

The components of controller 22 depicted in FIG. 3A may take the form of a packaged functional hardware unit (e.g., an electrical circuit) designed for use with other components, program code (e.g., software or firmware) executable by a (micro) processor or processing circuitry that usually performs a particular function of related functions, or a self-contained hardware or software component that interfaces with a larger system. For example, each module may include an application specific integrated circuit (ASIC), a Field Programmable Gate Array (FPGA), an electrical circuit, a digital logic circuit, an analog circuit, a combination of discrete circuits, gates, or any other type of hardware or combination thereof. Alternatively or in addition, each module may include software stored in a processor readable device (e.g., memory) to program a processor to perform the functions described herein.

Referring again to modules of the controller 22, a buffer manager/bus control 214 manages random access memory (RAM) 216 and controls the internal bus arbitration of controller 22. A read only memory (ROM) 218 stores boot code for the controller. Although illustrated in FIG. 3A as located separately from the controller 22, in other embodiments one or both of the RAM 216 and ROM 218 may be located within the controller. In yet other embodiments, portions of RAM and ROM may be located both within the controller 22 and outside the controller. Further, in some implementations, controller 22, RAM 216, and ROM 218 may be located on separate semiconductor die.

Device interface 220 includes logic 220A and a physical layer interface (PHY) 220B. The PHY 220B may provide the electrical interface with the host or next level storage controller. The logic 220A may be configured to facilitate transfer for data, control signals, and timing signals. The choice of the type of device interface 220 can depend on the type of memory being used. Examples of device interfaces 220 include, but are not limited to, UFS, eMMC, SATA, SATA Express, SAS, Fibre Channel, USB, M-PHY, UniPro, PCIe, and NVMe. In one embodiment, device interface 220 provides the single communication interface adapted to communicate with an external computing device for the controller 22 and memory die 108 of memory device 20.

Back end module 210 includes an error correction code (ECC) engine 224 that encodes the data bytes received from the host, and decodes and error corrects the data bytes read from the non-volatile memory die 108. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of protection for the data being written into the non-volatile memory system 100. In some cases, the RAID module 228 may be a part of the ECC engine 224. Note that the RAID parity may be added as an extra die or dies as implied by the common name, but it may also be added within the existing die, e.g. as an extra plane, or extra block, or extra WLs within a block. A memory interface 230 provides the command sequences to non-volatile memory die 108 and receives status information from non-volatile memory die 108. A flash control layer 232 controls the overall operation of back end module 210.

Additional components of memory device 20 illustrated in FIG. 3A include media management layer 238, which performs wear leveling of memory cells of non-volatile memory die 108. System 100 also includes other discrete components 240, such as external electrical interfaces, external RAM, resistors, capacitors, or other components that may interface with controller 22. In alternative embodiments, one or more of the physical layer interface 222, RAID module 228, media management layer 238 and buffer management/bus controller 214 are optional components that are not necessary in the controller 22.

The Flash Translation Layer (FTL) or Media Management Layer (MML) 238 may be integrated as part of the flash management that may handle flash errors and interfacing with the host. In particular, MML is responsible for the internals of non-volatile memory management. In particular, the MML 238 may include an algorithm in the memory device firmware which translates writes from the host into writes to the memory of a memory die 108. The MML 238 may be needed because: 1) the memory may have limited endurance; 2) the memory may only be written in multiples of pages; and/or 3) the memory may not be written unless it is erased as a block. The MML 238 understands these potential limitations of the memory which may not be visible to the host. Accordingly, the MML 238 attempts to translate the writes from host into writes into flash memory 126. As described below, erratic bits may be identified and recorded using the MML 238. This recording of erratic bits can be used for evaluating the health of blocks and/or word lines (the memory cells on the word lines).

Controller 22 also includes access control 236, which can be hardware only (e.g., electrical circuit) or software running on a processor. Access control 236 controls access to the non-volatile memory 108. In some embodiments, access is controlled based on an identifier of a source (or initiator) of a memory access. The memory access could be a read, write, or erase, but is not limited thereto. Access control 236 may perform steps 510-516 of process 500, process 800 and/or process 900.

Note that although the controller 22 in FIG. 3A is described as controlling flash memory, more generally the controller 22 is not limited to controlling flash memory. The controller 22 could be configured to manage operations in ReRAM memory, magnetoresistive memory (e.g., MRAM), phase change memory (e.g., PCRAM), or other types of memory.

FIG. 3B is a functional block diagram of an example memory die 108. The components depicted in FIG. 3B are electrical circuits. In one embodiment, memory die 108 includes a monolithic three dimensional memory structure 126 of memory cells (such as, for example, a 3D array of memory cells), control circuitry 110, and read/write circuits 128. In other embodiments, a two dimensional array of memory cells can be used. Memory structure 126 is addressable by word lines via a row decoder 124 and by bit lines via a column decoder 132. The read/write circuits 128 include multiple sense blocks 150 including SB1, SB2, . . . , SBp (sensing circuitry) and allow a page of memory cells to be read or programmed in parallel. Commands and data are transferred between controller 22 and memory die 108 via signal lines 118. In one embodiment, memory die 108 includes a set of input and/or output (I/O) pins that connect to lines 118.

One embodiment of memory structure 126 comprises a monolithic three dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. In one embodiment, memory structure 126 implements three dimensional NAND flash memory. Other embodiments include two dimensional NAND flash memory, two dimensional NOR flash memory, ReRAM cross-point memories, magnetoresistive memory (e.g., MRAM), phase change memory (e.g., PCRAM), and others.

Control circuitry 110 cooperates with the read/write circuits 128 to perform memory operations (e.g., erase, program, read, and others) on memory structure 126, and includes a state machine 112, an on-chip address decoder 114, and a power control module 116. The state machine 112 provides die-level control of memory operations. In one embodiment, state machine 112 is programmable by the software. In other embodiments, state machine 112 does not use software and is completely implemented in hardware (e.g., electrical circuits). In one embodiment, control circuitry 110 includes registers, ROM fuses and other storage devices for storing default values such as base voltages and other parameters. On-chip address decoder 114 provides an address interface between addresses used by host 140 or controller 22 to the hardware address used by the decoders 124 and 132. Power control module 116 controls the power and voltages supplied to the word lines and bit lines during memory operations. It can include drivers for word lines, selection transistors, source lines, and other components. Power control module 116 may include charge pumps for creating voltages. The sense blocks 150 include bit line drivers.

Any one or any combination of control circuitry 110, state machine 112, decoders 114/124/132, power control module 116, sense blocks 150, read/write circuits 128, access control 236, and controller 22 can be considered one or more control circuits that performs the functions described herein.

Multiple memory elements in memory structure 126 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors that can be used within memory structure 126. A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

In one embodiment, a three dimensional memory array is arranged so that memory cells occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory cells. The vertical columns may be arranged in a two dimensional configuration, e.g., in an x-y plane, resulting in a three dimensional arrangement of memory cells, with memory cells on multiple vertically stacked memory planes. Other configurations of memory elements in three dimensions can also constitute a three dimensional memory array.

By way of non-limiting example, in a three dimensional NAND memory array, the memory elements may be coupled together to form vertical NAND strings that traverse across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration.

One example memory system is a three dimensional memory structure that includes vertical NAND strings with charge-trapping material. Other (2D and 3D) memory structures can also be used with the technology described herein. For example, floating gate memories (e.g., NAND-type and NOR-type flash memory), ReRAM cross-point memories, magnetoresistive memory (e.g., MRAM), and phase change memory (e.g., PCRAM) can also be used.

One example of a ReRAM cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. This configuration is known as a spin valve and is the simplest structure for an MRAM bit. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCRAM) exploits the unique behaviour of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Figure 4A:
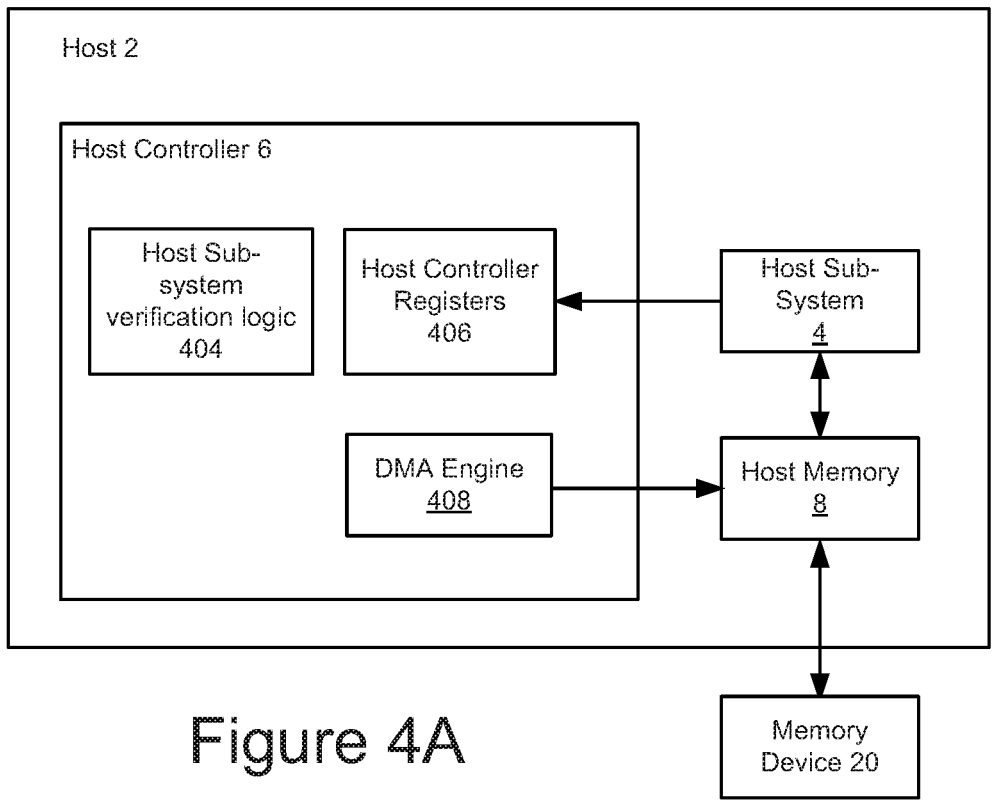
FIG. 4A is a block diagram of one embodiment of a host, connected to a memory device.

FIG. 4A is a block diagram of one embodiment of a host 2, connected to a memory device 20. The host memory 8 may be used in connection with transferring data to and from the memory device 20. The host memory 8 may include a number of data buffers. For a write command, the host sub-system 4 may place data into the data buffers. For a read command, the host sub-system 4 may read data that was transferred from memory device 20 to the data buffers. The host sub-system 4 may be configured to place memory access messages into the host memory 8. The memory access messages may contain commands and/or data. Note that only one host sub-system 4 is depicted in FIG. 4A to simplify the drawings. There may be multiple host sub-systems 4. However, it is not required that all host sub-systems 4 interact with the host controller 6. For example, host sub-system 4 in FIG. 4A could correspond to Sub-system A 4A in FIG. 2A. Alternatively, there may be multiple host sub-systems 4 that interact with the host controller 6, as depicted in FIG. 2B.

The host controller 6 has registers 406, which are exposed to the host sub-system 4, in one embodiment. In one embodiment, the registers 406 are used to control operation of the host controller 6. The host controller 6 may place status information in the registers 406. The host controller 6 places interrupt information in the registers 406, in one embodiment. The status and interrupt information may be read by the host sub-system 4. The registers 406 are UFS host registers, in one embodiment.

The host sub-system 4 is configured to place descriptors into registers 406, in one embodiment. The descriptors include the location of the memory access messages in the host memory 8. For example, a descriptor may contain a location of a command structure. An example of a command structure is shown below in FIG. 6A. As another example, a descriptor may contain a location of a data structure. An example of a data structure is shown below in FIG. 6B. The data descriptors may contain locations of data buffers in host memory 8. Alternatively, the aforementioned command structure or data structure that is in host memory 8, may contain pointers to the data buffers in host memory 8. Note that the data buffers could contain data to be written to the memory device 20, or may be used to receive data read from the memory device 20. In one embodiment, a driver that executes on host sub-system 4 places the descriptors into registers 406. The driver is a UFS driver, in one embodiment.

The host controller 6 has a DMA engine 408, which is configured to control direct memory access between host memory 8 and the memory device 20. Note that the DMA does not transfer data directly to the non-volatile memory 24. Rather, the memory controller 22 in the memory device 20 controls access to/from the non-volatile memory 24. In one embodiment, the memory device 20 has write buffers into which the data from the host memory 8 is first transferred.

The host controller 6 has host sub-system verification logic 404, which is configured to verify that the correct sub-system is identified in the memory access message to the memory device 20. In one embodiment, the host sub-system verification logic 404 is configured to insert the correct sub-system identifier into a memory access message that a sub-system stored into the host memory 8. In one embodiment, the host sub-system verification logic 404 is configured to verify that the sub-system identifier that is already present in a memory access message in the host memory 8 correctly identifies the sub-system attempting to access the non-volatile memory 24.

In one embodiment, information transfer between the host 2 and memory device 20 is performed through messages referred to as UFS Protocol Information Units. These messages may be UFS defined data structures. Note that the UFS Protocol Information Units may be used to transfer commands, data, and/or status. More generally, the information transfer between the host 2 and memory device 20 nay be implemented through packets that encapsulate commands, data, and/or status.

Figure 4B:
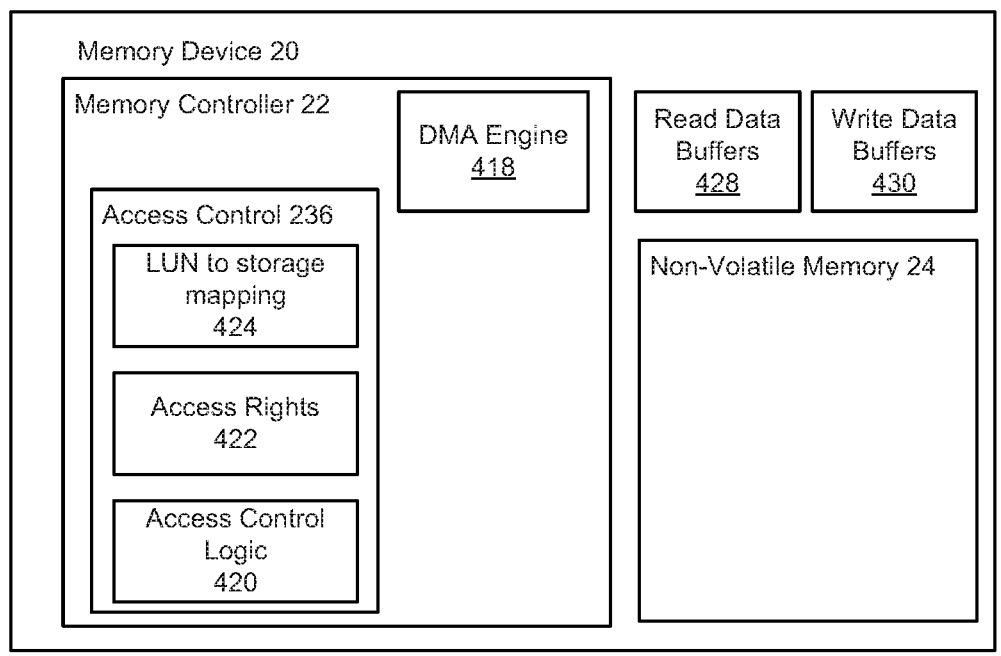
FIG. 4B is a block diagram of one embodiment of a memory device.

FIG. 4B is a block diagram of one embodiment of a memory device 20. The memory device 20 could be embedded in a host system. The memory device 20 is not required to be embedded in a host system. This memory device 20 may be used for the memory device 20 in FIG. 4A, but is not limited thereto.

The memory device 20 has non-volatile memory 24, read data buffers 428, write data buffers 430, and memory controller 22. The memory controller 22 has DMA engine 418 and access control 236. The access control includes access control logic 420, access rights 422, and LUN to storage mapping 424. The access control logic 420 is configured to control access to the non-volatile memory 24. In one embodiment, the access control logic 420 is configured to access an initiator identifier in a memory access message from the host 2 and grant or deny access to the non-volatile memory 24 based on the initiator identifier.

The access rights 422 contains the access rights of the various initiators of memory access requests. The access rights may be defined in a variety of ways. In one embodiment, the access rights are defined in terms of LUNs. In one embodiment, the access rights are defined in terms of logical block addresses (LBAs). The access rights could be stored in the memory controller 22 at any time. For example, the access rights could be assigned when the host 2 (and embedded memory device) are configured. The access rights could be provided to the memory controller 22 when the memory device 20 is powered on. The access rights are learned by the memory controller 22, in one embodiment.

The LUN to storage mapping 424 contains a mapping of LUNs to physical regions of the non-volatile memory. A LUN can be any size. A LUN might be a portion of one memory die, an entire memory die, multiple memory dies, etc. As noted above, a LUN is an identifier of a Logical Unit. A Logical Unit is an externally addressable, independent, processing entity. In one embodiment, a Logical Unit processes SCSI tasks (commands). In one embodiment, Logical Units defined in accordance with UFS are supported.

The read data buffers 428 are used to temporarily store data read from the non-volatile memory 24. Note that the memory controller 22 may process this data, such as perform error correction prior to storage in the read buffers 428. The DMA engine 418 is configured to perform a DMA from the read data buffers 428 to the host memory 8, in one embodiment.

The write data buffers 430 are used to temporarily store data from the host memory 8 that is to be written to the non-volatile memory 24. Note that the memory controller 22 may process this data, such as form a codeword that include a redundancy code prior to writing to the non-volatile memory 24.

The components of access control 236 may take the form of a packaged functional hardware unit (e.g., an electrical circuit) designed for use with other components, program code (e.g., software or firmware) executable by a (micro) processor or processing circuitry that usually performs a particular function of related functions, or a self-contained hardware or software component that interfaces with a larger system. For example, each module may include an application specific integrated circuit (ASIC), a Field Programmable Gate Array (FPGA), an electrical circuit, a digital logic circuit, an analog circuit, a combination of discrete circuits, gates, or any other type of hardware or combination thereof. Alternatively or in addition, each module may include software stored in a processor readable device (e.g., memory) to program a processor to perform the functions described herein.

FIG. 5 is a flowchart of one embodiment of a process 500 of controlling access to data in non-volatile storage. The process 500 may be performed within a host system such as those in FIG. 1A or 1B. The process 500 may be performed when one sub-system interfaces directly with a host controller 6, such as in FIG. 2A. The process 500 may be performed when more than one sub-system interfaces directly with a host controller 6, such as in FIG. 2B.

Steps 502 and 504 describe steps performed by the initiator of the memory access request, in one embodiment. The initiator may be one of the host sub-systems 4, as depicted in FIG. 1A, 2A or 2B. The initiator may be a processor, such as one of the processors in FIG. 1B. The initiator may be an ECU, such as one of the ECUs in FIG. 1C. The initiator is not limited to those examples. The initiators are not limited to any particular type of entity. The initiators might be different software applications that are executed by a processor. The initiators could be located on different semiconductor packages or on the same semiconductor package. Steps 506 and 508 describe steps performed by the host controller 6, in one embodiment. Steps 506 and 508 could be performed by any of the host controllers 6 described herein, but are not limited just to the described embodiments. Steps 510, 512, 514, and 516 describe steps performed by the memory controller 22 in the memory device 20, in one embodiment. Steps 510-516 could be performed by any of the memory controllers 22 described herein, but are not limited just to the described embodiments.

Prior to performing process 500, certain information may have been stored on the non-volatile memory device 20. This information may define the access rights of various initiators (e.g., sub-systems) on the host 2. In one embodiment, this information is stored in access rights 422 (see FIG. 4B).

Step 502 includes an initiator writing a memory access message to a host buffer in host memory 8. For example, one of the sub-systems 4A-4C writes the memory access message to host memory 8. The memory access message requests access to the non-volatile memory 24, in one embodiment. This access may be write access, read, access, erase access, but is not limited thereto. In one embodiment, the memory access message is a UFS Protocol Information (UPIU) command structure. In one embodiment, the memory access message is an UPIU data structure.

Figure 6A:
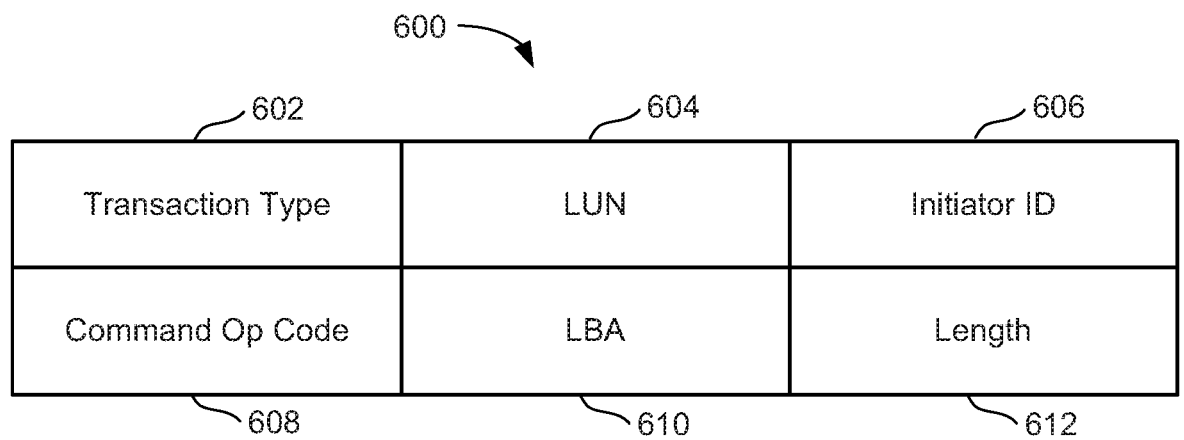
FIGS. 6A and 6B depict example memory access messages.

FIG. 6A depicts an example in which the memory access message is a command message 600. The initiator may write the command message 600 to host memory 8 in step 502. Note that the command message 600 is simplified, and may contain other fields. Also, the command message 600 is not required to contain all of the depicted fields. The transaction type field 602 is used to specific the type of transaction. Examples for this field 602 include: command, data in, data out, response, and ready for data. Since this is an example of a command message 600, the initiator sets this field 602 to an appropriate value to indicate that this is a command. The LUN field 604 contains the logical unit number of the target. The target refers to a logical construct in the memory device 20 that processes the command to access the non-volatile memory 24, in one embodiment. The memory controller 22 is configured to process the commands for the targets, based on the LUN, in one embodiment.

The Initiator ID field 606 is used to specify the initiator of the command. In one embodiment, the initiator fills in this field 606. If the initiator fills the field 606, the host controller 6 may verify the content of the Initiator ID field 606. In one embodiment, the initiator does not fill in the Initiator ID field 606. Instead, the host controller 6 fills in the Initiator ID field 606.

The command Op Code 608 specifies the operation code for this command. This might be memory access command such as read, write, erase, etc. The LBA field 610 specifies the Logical Block Address for the memory access. The length field 612 specifies the length of the data involved in the command. Fields 608-612 may encapsulate a memory access command. For example, the fields 618-612 may encapsulate a SCSI command.

In one embodiment, the command message 600 is UPIU command structure. However, the command message 600 is not required to be a UPIU command structure.

Figure 6B:
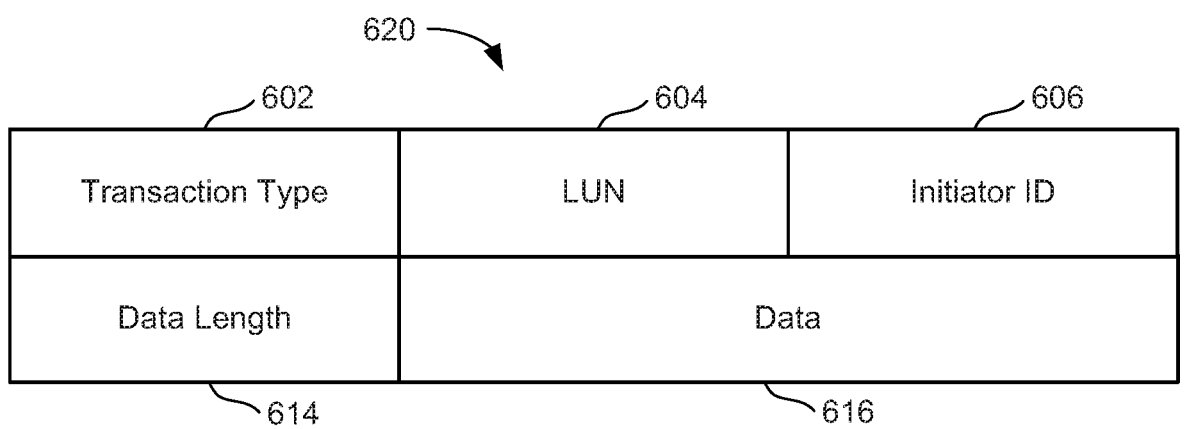

FIG. 6B depicts a simplified example in which the memory access message is a data out message 620, which the initiator may write to host memory 8 in step 502. The transaction type field 602, LUN field 604, and Initiator ID field 606 may be similar to those described above for the command message 600. However, in this case the transaction type field 602 may be filled to indicate that this is a data out transfer. As an alternative, the transaction type field 602 may be filled to indicate that this is a data in transfer.

The initiator might or might not fill in the Initiator ID field 606. If the initiator fills the field 606, the host controller 6 may verify the content of the Initiator ID field 606. In one embodiment, the initiator does not fill in the Initiator ID field 606. In this case, the host controller 6 may fill the Initiator ID field 606.

The data length field 614 specifies the length of the data contained in the data out message 620. The data field 616 is the data payload. In one embodiment, the data out message 620 is a data out UPIU structure. In one embodiment, the data out message 620 is a data in UPIU structure. However, the data out message 620 is not required to be a UPIU command structure.

Step 504 includes the initiator providing a descriptor for the memory access message to the host controller 6. For example, one of the sub-systems 4 may provide a descriptor to the command message 600 and a descriptor to the data out message 620 to the host controller 6. In one embodiment, the initiator places the descriptors in host controller registers 406. These descriptors define where to locate the command message 600 and the data out message 620 in host memory 8, in one embodiment.

In step 506, the host controller 6 verifies the Initiator ID in the memory access message. Note that the memory access message may be stored in host memory 8. In one embodiment, the host controller 6 verifies the Initiator ID in the command message 600. In one embodiment, the host controller 6 verifies the Initiator ID in the data out message 620. In one embodiment, the verification includes the host controller 6 determining whether the existing Initiator ID in Initiator ID field 606 in the command message 600 is correct. In one embodiment, the verification includes the host controller 6 determining whether the existing Initiator ID in Initiator ID field 606 in the data out message 620 is correct.

In one embodiment, the verification includes the host controller 6 inserting the Initiator ID in Initiator ID field 606 in the memory access message. For example, the host controller 6 may insert the Initiator ID in Initiator ID field 606 of the command message 600. In one embodiment, the verification includes the host controller 6 inserting the Initiator ID in Initiator ID field 606 in the data out message 620.

Step 508 includes the host controller 6 providing the memory access message to the memory device 20. The host controller 6 provides at least the command message 600 in one embodiment, in one embodiment. The host controller 6 provides both the command message 600 and the data out message 620, in one embodiment. Further details of one embodiment of step 508 are depicted below with respect to FIG. 7B.

Step 510 includes the memory device 20 accessing the Initiator ID in the memory access message. In one embodiment, memory controller 22 access the value in the Initiator ID field 606 of the command message 600. In one embodiment, memory controller 22 access the value in the Initiator ID field 606 of the data out message 620.

Step 512 includes the memory device 20 determining whether to allow access to the non-volatile memory. In one embodiment, memory controller 22 determines whether the initiator that is specified in the memory access message has access rights to a region of the non-volatile memory 24 that is indicated by the memory access message (or by another message). In one embodiment, memory controller 22 determines whether the initiator that is specified in the command message 600 has access rights to a region of the non-volatile memory 24 that is indicated by the command message 600. In one embodiment, memory controller 22 determines whether the initiator that is specified in the data out message 620 has access rights to a region of the non-volatile memory 24 that is indicated by the data out message 620. Further details of embodiments of steps 510 and 512 are discussed with respect to FIGS. 7A-7C.

Thus, the data access to the non-volatile memory is controlled by the memory controller 22, in one embodiment. The non-volatile memory and the memory controller may both be embedded within the same casing. The non-volatile memory and the memory controller may both be embedded within the same semiconductor package. This provides for a very secure technological solution, as the casing may make it very difficult to hack the memory device 20.

Figure 7A:
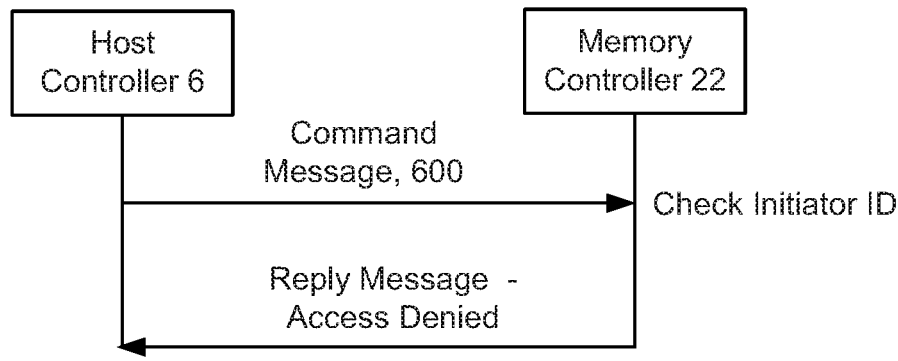
FIGS. 7A, 7B, and 7C depict example of messages passed between the host controller and the memory controller.

FIG. 7A depicts one example of messages passed between the host controller 6 and the memory controller 22 when the memory controller denies memory access. First, the host controller 6 provides a command message 600 to the memory controller 22. The host controller 6 provides the command message 600 in one embodiment of step 508 of process 500.

In response to receiving the command message 600, the memory controller 22 checks the Initiator ID in the command message 600. This is one embodiment of steps 510-512 of process 500. In this example, the memory controller 22 determines that the initiator does not have memory access. In one embodiment, the memory controller 22 determines whether the initiator is permitted access to the LUN that is specified in the LUN field 604 in the command message 600. In one embodiment, the memory controller 22 determines whether the initiator is permitted access to the range of LBAs that is specified by the combination of the LBA field 610 and Length field 612 in the command message 600. In this example, the memory controller 22 sends a reply message to the host controller 6 indicating that the initiator does not have the right to access a region of the non-volatile memory 24 that is indicated by the command message 600. This reply message may be sent in step 516 of process 500.

Figure 7B:
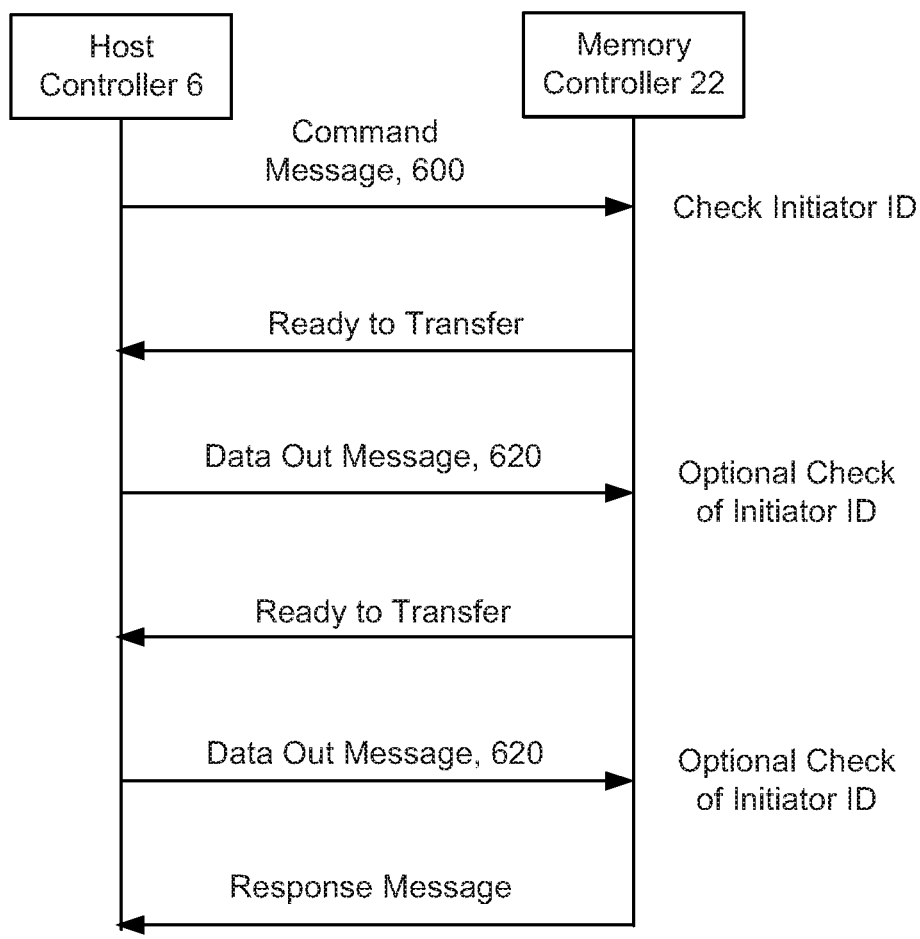

FIG. 7B depicts one example of messages passed between the host controller 6 and the memory controller 22 when the memory controller allows write access to the non-volatile memory 24. The host controller 6 sending the command message 600 and the memory controller checking the initiator ID in the command message may be similar to the example of FIG. 7A. However, in this example, the memory controller 22 grants memory access by sending the host controller 6 a ready to transfer message. The ready to transfer message indicates that the memory controller 22 is ready to receive data to be written to the non-volatile memory 24. The host controller 6 provides a data out message 620 to the memory controller 22 in response to the ready to transfer message.

In one embodiment, when the host controller 6 receives the ready to transfer message this initiates a DMA from the host memory 8 to a write buffer 430 in the memory device 20. Note that this buffer is a write buffer 430 in the memory device 20, and is not the final destination of the data in the non-volatile memory 24. Thus, the data out message 620 may be sent in a DMA from host memory 8.

Since the data out message 620 may contain an Initiator ID, the memory controller 22 may optionally check that the initiator specified by the Initiator ID field 606 in the data out message 620 has access rights to the region of the non-volatile memory 24 to be written to with respect to this data out message 620. The message flow in FIG. 7B assumes that the memory controller grants memory access.

The message flow then indicates that the memory controller 22 sends another ready to transfer message to the host controller 6, followed by the host controller 6 sending another data out message 620 to the memory controller 22. In general, there may be one or more data out messages 620 sent from the host controller 6 to the memory controller 22. The message flow ends with a response message sent from the memory controller 22 to the host controller 6. The response message may indicate whether or not the data was successfully written to non-volatile memory 24.

Figure 7C:
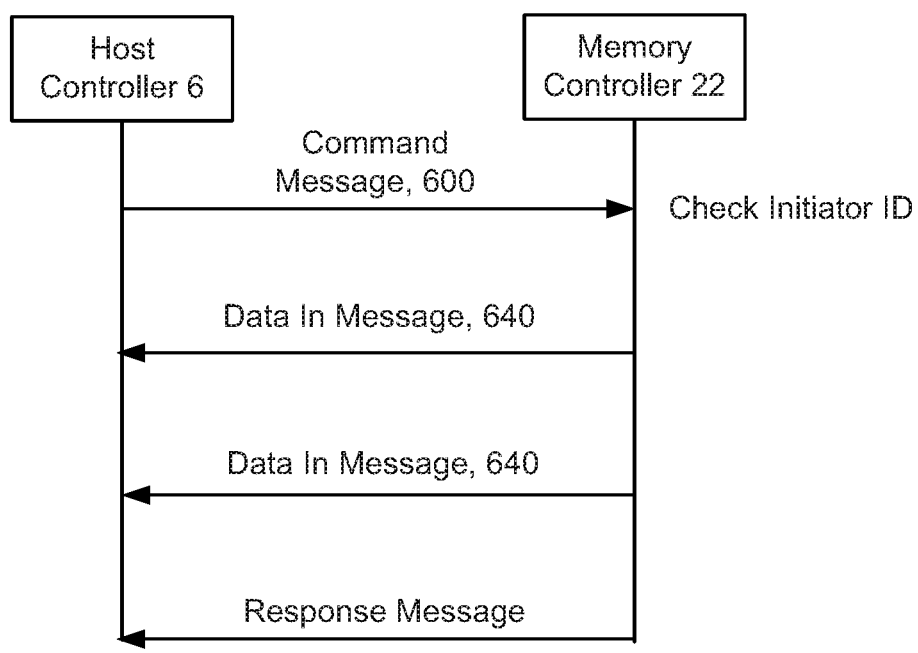

FIG. 7C depicts one example of messages passed between the host controller 6 and the memory controller 22 when the memory controller allows read access to the non-volatile memory 24. The host controller 6 sending the command message 600 and the memory controller checking the initiator ID in the command message may be similar to the example of FIG. 7A. However, in this example, the memory controller 22 grants memory access by sending the host controller 6 a data in message 640. The data in message 640 contains at least a portion of the data that was requested from the non-volatile memory 24. Two data in messages 640 are shown in the message flow of FIG. 7C. In general, the memory controller 22 may send one or more data in messages 640. The data in message 640 may have a similar format for the data out message 620 in FIG. 6B. The message flow ends with a response message sent from the memory controller 22 to the host controller 6. The response message may indicate whether or not the data was successfully read from non-volatile memory 24.

It will be appreciated that the message flows in FIGS. 7A-7C are examples and the many other message flows are possible. Also, the message flows referenced the example messages 600, 620 in FIGS. 6A and 6B to facilitate explanation. The message flows in FIGS. 7A-7C can be adapted to other message structures.

Figure 8:
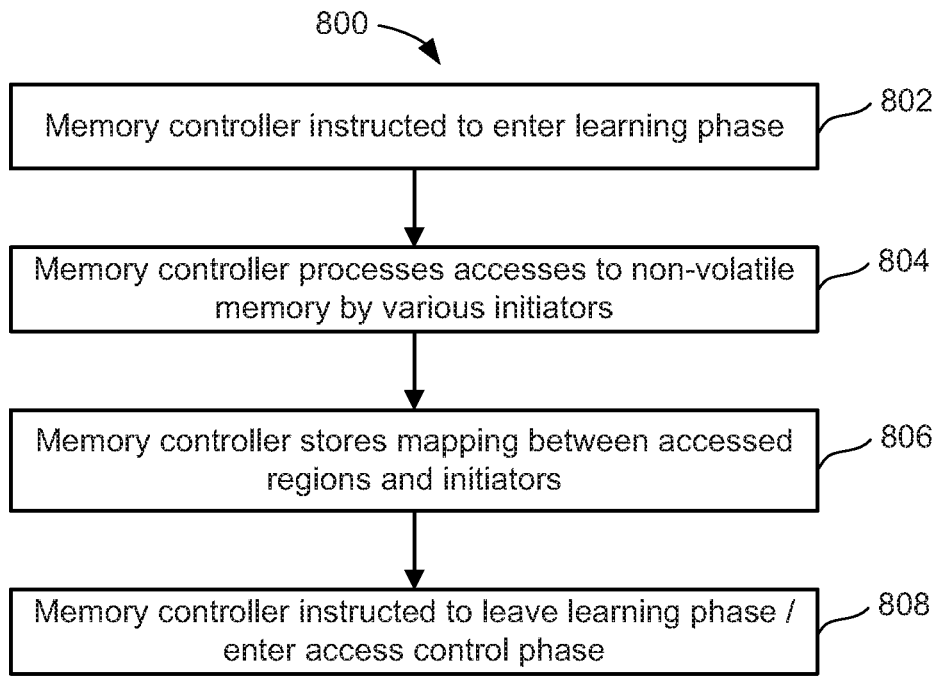
FIG. 8 is a flowchart of one embodiment of a process of a memory controller learning what regions of the non-volatile memory various initiators are allowed to access.

FIG. 8 is a flowchart of one embodiment of a process 800 of a memory controller 22 learning what regions of the non-volatile memory 24 various initiators are allowed to access. The process 800 may be performed during a learning phase in which accesses to the non-volatile memory 24 are trusted. The process 800 may be performed within a host system such as those in FIG. 1A or 1B.

Step 802 includes the memory controller 22 being instructed to enter the learning phase. In one embodiment, host controller 6 sends the instruction to the memory controller 22. The learning phase might be entered when the host system knows that memory accesses by the various sub-systems 4 can be trusted. This might occur when the host system is first being configured, for example.

Step 804 includes the memory controller 22 processing accesses to the non-volatile memory 24 by various initiators. Since this is the learning phase, the memory controller assumes that the initiator is permitted the requested access.

Step 806 includes the memory controller 22 storing a mapping between the access regions and the initiators. In one embodiment, this mapping is stored in access rights 422.

Step 808 includes instructing the memory controller 22 to leave the learning phase, and to enter an access control phase. In one embodiment, host controller 6 sends the instruction to the memory controller 22. In response, the memory controller 22 no longer continues to build the mapping between access regions and the initiators. Instead, the memory controller 22 enforces access control to the non-volatile memory 24 based at least in part on the mapping that was developed in step 806. Note that this mapping could be augmented with other information that indicates what region of the non-volatile memory 24 are accessible to what initiators. For example, this other information might have been stored in the memory controller 22 when the host system (including an embedded memory device 20) was configured.

Figure 9:
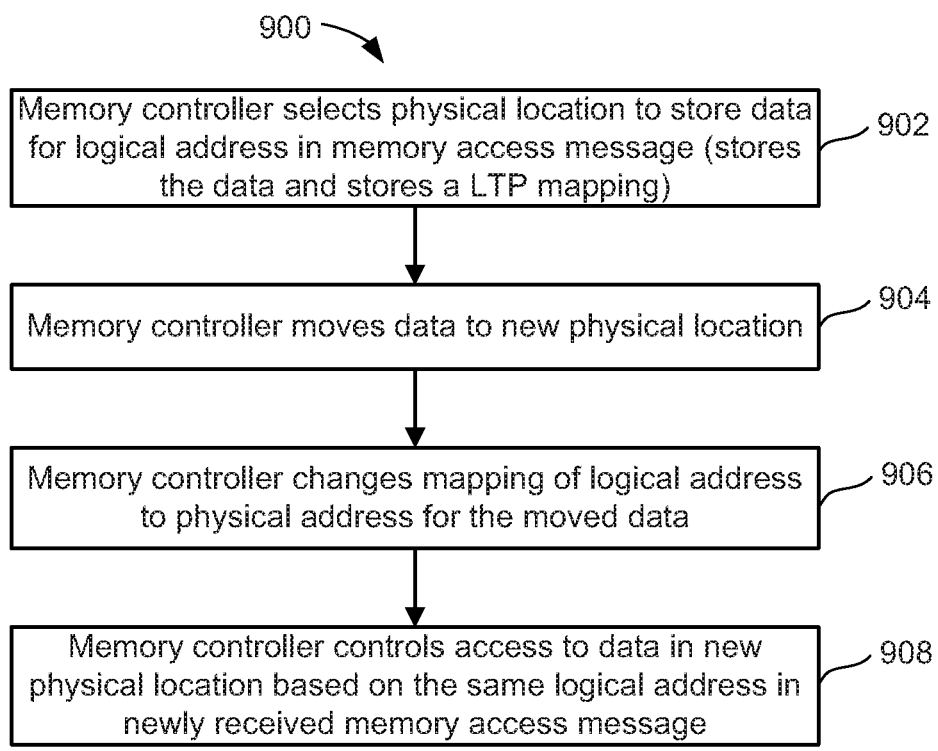
FIG. 9 is a flowchart of one embodiment of a process of a memory controller controlling access to non-volatile memory.

FIG. 9 is a flowchart of one embodiment of a process 900 of a memory controller 22 controlling access to non-volatile memory 24. Process 900 takes advantage of the ability of the memory controller 22 to select what physical location to store data, as well as the ability of the memory controller 22 to move data from one physical location to another.

Step 902 includes the memory controller 22 selecting a physical location (in non-volatile memory 24) to store data for a logical address in a memory access message. Step 902 may include the memory controller selecting one or more physical block addresses at which to store data for corresponding logical block addresses. The physical block size may be the same as the logical block size. The physical block size (and the logical block size) could be of any size. Note that the physical blocks being referred to here are not necessarily "erase blocks" in a NAND memory array. An erase block, with respect to NAND, is typically the minimum unit of memory cells that are erased together. There could be many physical blocks within an erase block.

Step 902 may also include the memory controller 22 storing the data in the physical locations. Step 902 may further include the memory controller updating a mapping from logical addresses to physical address. In one embodiment, the memory controller updates a logical-to-physical translation (LTP) table.

Step 904 includes the memory controller 22 moving the data to a new physical location. Step 904 might be performed for a variety of reasons. As one example, the memory controller may perform a wear leveling algorithm. The new location could be anywhere in the non-volatile memory. The new location could include, but is not limited to, a different location in an erase block, a different erase block, the same memory plane, a different memory plane, the same memory die, a different memory die.

Step 906 includes the memory controller changing the mapping from the logical address to the physical location in response to moving the data. In one embodiment, the memory controller updates the logical-to-physical translation (LTP) table.

Step 908 includes the memory controller 22 controlling access to the data that is now in the new physical location based on the same logical address that is in a newly received memory access message. This access control may be performed in accordance with process 500.

Thus, process 900 provides a great deal of flexibility in determining what physical regions of the non-volatile memory 24 are accessible to each initiator. This can be used to prevent an initiator from running out of memory access in event that a physical region to which the initiator has access becomes worn out. For example, if the initiator is originally assigned 1000 erase blocks and writes those blocks frequently, some of the 1000 blocks could potentially become worn out and need to be retired. To further elaborate, one initiator may write its region (e.g., erase blocks) of memory frequently, and another initiator may perform mostly read access. In this case, the memory controller 22 could perform wear leveling to swap data in the physical region of one initiator with the other initiator. This can extend the useful life of the high write access region.

A first embodiment includes an apparatus, comprising: non-volatile memory, memory controller, a memory device interface, and a host controller. The host controller is configured to obtain a memory access message to access the non-volatile memory, and provide the memory access message to the memory device interface. The memory access message contains an identifier of an initiator that seeks access to the non-volatile memory. The memory controller is in communication with the non-volatile memory and the memory device interface. The memory controller is configured to: access the identifier of the initiator from the memory access message; and control access to the non-volatile memory based on the accessed initiator identifier.

In a second embodiment, and in accordance with the first embodiment, the non-volatile memory and the memory controller are embedded within a casing.

In a third embodiment, and in accordance with the first or second embodiments, the non-volatile memory and the memory controller are embedded within a semiconductor package.

In a fourth embodiment, and in accordance with any of the first to third embodiments, the host controller is further configured to add the identifier of the initiator to the memory access message.

In a fifth embodiment, and in accordance with any of the first to fourth embodiments, the memory controller is further configured to: select a physical location in the non-volatile memory at which to store data for a logical address in the memory access message; and store a mapping between the logical address and the physical location at which the data for the logical address is stored.

In a sixth embodiment, and in accordance with the fifth embodiment, the memory controller is further configured to: move the data at the physical location to a new physical location in the non-volatile memory; change the mapping to map the logical address to the new physical location; and grant or deny access to the data at the new physical location based on whether an initiator seeking access to the data at the new physical location has access rights to the logical address.

In a seventh embodiment, and in accordance with any of the first to sixth embodiments, the memory access message is a Universal Flash Storage (UFS) Protocol Information Unit.

In an eighth embodiment, and in accordance with any of the first to seventh embodiments, the host controller is further configured to verify the identifier of the initiator in the memory access message.

In a ninth embodiment, and in accordance with any of the first to eighth embodiments, the apparatus further comprises a plurality of sub-systems that share access to the non-volatile memory. The initiator is one of the plurality of sub-systems.

In a tenth embodiment, and in accordance with any of the first to ninth embodiments, the host controller is implemented in hardware.

One embodiment disclosed herein includes a method comprising: verifying, by a host controller, an initiator identifier in a memory access message; providing, by the host controller, the memory access message to a non-volatile memory device; accessing, by a memory controller on the non-volatile memory device, the initiator identifier in the memory access message; and granting or denying access to non-volatile memory on the non-volatile memory device, by the memory controller, based on whether the initiator identified in the memory access message has access rights to a region of the non-volatile memory indicated by the memory access message.

One embodiment disclosed herein includes a non-volatile memory system, comprising a non-volatile memory device and a host. The non-volatile memory device comprises: i) non-volatile memory; ii) memory controller means for controlling the non-volatile memory; iii) memory device interface means for communicating with the host connected to the non-volatile memory device. The host comprises: i) a plurality of host sub-systems; ii) host interface means for communicating with non-volatile memory device via the memory device interface means; iii) host memory; and iv) host controller means for accessing a memory access message from the host memory. The host controller means is further for inserting an identifier of an initiator host sub-system that seeks access to the non-volatile memory. The host controller means is further for providing the memory access message to the non-volatile memory device. The memory controller means is further for: accessing the identifier of the initiator host sub-system from the memory access message; and granting or denying non-volatile memory access to the initiator host sub-system based on whether the initiator host sub-system has access rights to a region of the non-volatile memory to which the initiator host sub-system seek access.

In one embodiment, the memory controller means comprises one or more of memory controller 22, control circuitry 110, state machine 112, decoders 114, 124, 132, power control 115, read/write circuits 128, access control 236, DMA engine 418, a packaged functional hardware unit, program code (e.g., software or firmware) executable by a (micro) processor or processing circuitry, an application specific integrated circuit (ASIC), a Field Programmable Gate Array (FPGA), an electrical circuit, a digital logic circuit, an analog circuit, a combination of discrete circuits, gates, or any other type of hardware or combination thereof.

In one embodiment, the memory device interface means comprises one or more of device interface 220, Logic 220A, PHY 220B, DMA engine 418, a packaged functional hardware unit, program code (e.g., software or firmware) executable by a (micro) processor or processing circuitry, an application specific integrated circuit (ASIC), a Field Programmable Gate Array (FPGA), an electrical circuit, a digital logic circuit, an analog circuit, a combination of discrete circuits, gates, or any other type of hardware or combination thereof.

In one embodiment, the host interface means comprises one or more of host interface 45, DMA engine 408, a packaged functional hardware unit, program code (e.g., software or firmware) executable by a (micro) processor or processing circuitry, an application specific integrated circuit (ASIC), a Field Programmable Gate Array (FPGA), an electrical circuit, a digital logic circuit, an analog circuit, a combination of discrete circuits, gates, or any other type of hardware or combination thereof.

In one embodiment, the host controller means comprises one or more of host controller 6, host controller registers 406, DMA engine 418, a packaged functional hardware unit, program code (e.g., software or firmware) executable by a (micro) processor or processing circuitry, an application specific integrated circuit (ASIC), a Field Programmable Gate Array (FPGA), an electrical circuit, a digital logic circuit, an analog circuit, a combination of discrete circuits, gates, or any other type of hardware or combination thereof.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus, comprising:
   non-volatile memory;
   a memory device interface;
   a host controller configured to:
   obtain Universal Flash Storage (UFS) Protocol Information Units to access the non-volatile memory; and
   provide the UFS Protocol Information Units to the memory device interface, each UFS Protocol Information Unit containing an identifier of an initiator that seeks access to data at a logical address in the non-volatile memory; and
   a memory controller in communication with the non-volatile memory and the memory device interface, the memory controller configured to:
   process accesses by initiators to regions of the non-volatile memory during a learning phase in which access to the regions of the non-volatile memory by the initiators is trusted;
   store a mapping between the initiators and the regions of the non-volatile memory accessed by the initiators during the learning phase, including store mappings between logical addresses and physical addresses in the non-volatile memory, the mappings including a first mapping between a first physical address and a first logical address to which a first initiator has access and a second mapping between a second physical address and a second logical address to which a second initiator has access;
   access a first initiator identifier from a first of the UFS Protocol Information Units, the first UFS Protocol Information Unit seeking access to data for the first logical address during an access phase;
   control access to data at the first physical address in the non-volatile memory to which the first logical address is presently mapped based on the first accessed initiator identifier during the access phase;
   perform wear leveling to swap data at the first physical address to which the first initiator has access based on the first logical address with data at the second physical address to which the second initiator has access based on the second logical address during the access phase, including change the first mapping to be between the first logical address and the second physical address and change the second mapping to be between the second logical address and the first physical address;
   access a second initiator identifier from a second of the UFS Protocol Information Units during the access phase, the second UFS Protocol Information Unit seeking access to data for the first logical address; and control access to data at the second physical address in the non-volatile memory to which the first logical address is presently mapped based on the second accessed initiator identifier during the access phase.

2. The apparatus of claim 1, wherein the non-volatile memory and the memory controller are embedded within a casing.

3. The apparatus of claim 1, wherein the non-volatile memory and the memory controller are embedded within a semiconductor package.

4. The apparatus of claim 1, wherein the host controller is further configured to add the identifiers of the initiators to the UFS Protocol Information Units.

5. The apparatus of claim 1, wherein the host controller is further configured to verify the identifier of the initiator in the UFS Protocol Information Unit.

6. The apparatus of claim 5, further comprising:
a plurality of sub-systems that share access to the non-volatile memory, wherein the initiator is one of the plurality of sub-systems.

7. The apparatus of claim 1, wherein the host controller is implemented in hardware.

8. The apparatus of claim 1, wherein the memory controller is further configured to:
grant a third initiator write access to the non-volatile memory by sending a ready to transfer message to the host controller, the ready to transfer message indicates that the memory controller is ready to receive data to be written to the non-volatile memory.

9. The apparatus of claim 8, wherein the memory controller is further configured to:
grant the third initiator read access to the non-volatile memory by sending a data in message to the host controller, the data in message contains at least a portion of the data that was requested from the non-volatile memory.

10. The apparatus of claim 1, wherein the first physical address is on a first memory die and the second physical address is on a second memory die.

11. The apparatus of claim 1, wherein the first physical address and the second physical address reside on the same memory die.

12. A method comprising:
processing, by a memory controller in a non-volatile memory device, accesses by initiators to regions of non-volatile memory in the non-volatile memory device during a learning phase;
assuming, by the memory controller, that the initiators are permitted to access the regions during the learning phase;
storing a mapping between the initiators and the regions of the non-volatile memory accessed by the initiators during the learning phase, including storing, by the memory controller, a mapping between logical addresses and physical addresses in the non-volatile memory, the mapping including a first mapping from a first physical address to a first logical address to which a first initiator has access and a second mapping from a second physical address to a second logical address to which a second initiator has access;
verifying, by a host controller during an access control phase, initiator identifiers in respective memory access messages;
providing, by the host controller during the access control phase, the memory access messages to the non-volatile memory device;
accessing, by the memory controller during the access control phase, a first initiator identifier in a first of the memory access messages, the first memory access message specifying the first logical address to which the first initiator seeks access; and
granting access to the first physical address in non-volatile memory on the non-volatile memory device during the access control phase, by the memory controller, based on a determination that the stored mapping indicates that the first initiator identified in the first memory access message has access rights to the first logical address indicated by the first memory access message;
performing wear leveling to swap data at the first physical address to which the first initiator has access with data at the second physical address to which the second initiator has access, including changing the mapping of the first physical address to the second logical address and changing the mapping of the second physical address to the first logical address;
accessing, by the memory controller during the access control phase, a second initiator identifier in a second of the memory access messages, the second memory access message specifying the first logical address to which the first initiator seeks access; and
granting access to the second physical address in the non-volatile memory on the non-volatile memory device during the access control phase, by the memory controller, based on a determination that the stored mapping indicates that the first initiator identified in the second memory access message has access rights to the first logical address.

13. The method of claim 12, wherein verifying the initiator identifiers in the memory access messages comprises:
inserting the initiator identifiers into the memory access messages, wherein the memory access messages comprise Universal Flash Storage (UFS) Protocol Information Units.

14. The method of claim 13, wherein:
inserting the initiator identifiers into the memory access messages comprises writing the initiator identifiers into the memory access messages that are stored in host memory in a host system; and
providing the memory access messages to the non-volatile memory device comprises transferring the memory access messages from the host memory to the non-volatile memory device.

15. The method of claim 12, wherein verifying the initiator identifiers in the memory access messages comprises:
verifying that the initiator identifiers in the memory access messages correspond to the respective initiator that placed the memory access message into host memory.

16. The method of claim 12, wherein performing the wear leveling extends a useful life of a high write access region that was mapped during the learning phase as accessible to the first initiator.

17. A non-volatile memory system, comprising:
a non-volatile memory device comprising:
  i) non-volatile memory;
  ii) first means for controlling the non-volatile memory; and
  iii) second means for communicating with a host connected to the non-volatile memory device; and
a host comprising:

i) a plurality of host sub-systems;
ii) third means for communicating with the non-volatile memory device via the second means;
iii) host memory; and
iv) fourth means for:
  accessing Universal Flash Storage (UFS) Protocol Information Units from the host memory;
  inserting, into ones of the UFS Protocol Information Units, an identifier of an initiator host sub-system that seeks access to data at a logical address in the non-volatile memory; and
  providing the UFS Protocol Information Units to the non-volatile memory device;
wherein the first means further comprises:
  means for processing accesses by initiators to regions of the non-volatile memory during a learning phase;
  means for assuming that the initiators are permitted to access the regions during the learning phase;
  means for storing a mapping between the initiators and the regions of the non-volatile memory accessed by the initiators during the learning phase, including means for storing a mapping between logical addresses and physical addresses in the non-volatile memory, the mapping including a first mapping from a first physical address to a first logical address to which a first initiator has access and a second mapping from a second physical address to a second logical address to which a second initiator has access;
  means for accessing an identifier of a first host sub-system and a first logical address to which the first host sub-system seeks access from a first of the UFS Protocol Information Units during an access phase; and
  means for granting non-volatile memory access to the first host sub-system based on a determination that the first host sub-system has access rights to the first logical address during the access phase, the first logical address mapped to a first physical address in the non-volatile memory;
  means for performing wear leveling to swap data at the first physical address with data at the second physical address during the access phase, including change the first mapping from the first physical address to the second logical address and change the second mapping from the second physical address to the first logical address;
  means for accessing an identifier of the first host sub-system and the first logical address to which the first host sub-system seeks access from a second of the UFS Protocol Information Units during the access phase; and
  means for granting non-volatile memory access to the first host sub-system based on a determination that the first host sub-system has access rights to the first logical address during the access phase.

18. The non-volatile memory system of claim 17, wherein the first means is further for:
  selecting physical addresses to store data for logical addresses in UFS Protocol Information Units;
  storing a mapping between the logical addresses and the physical addresses at which the data is stored; and
  granting or denying non-volatile memory access to the initiator host sub-system based on whether the initiator host sub-system has access rights to a logical address in the UFS Protocol Information Unit.

\* \* \* \* \*